Patented Nov. 9, 1943

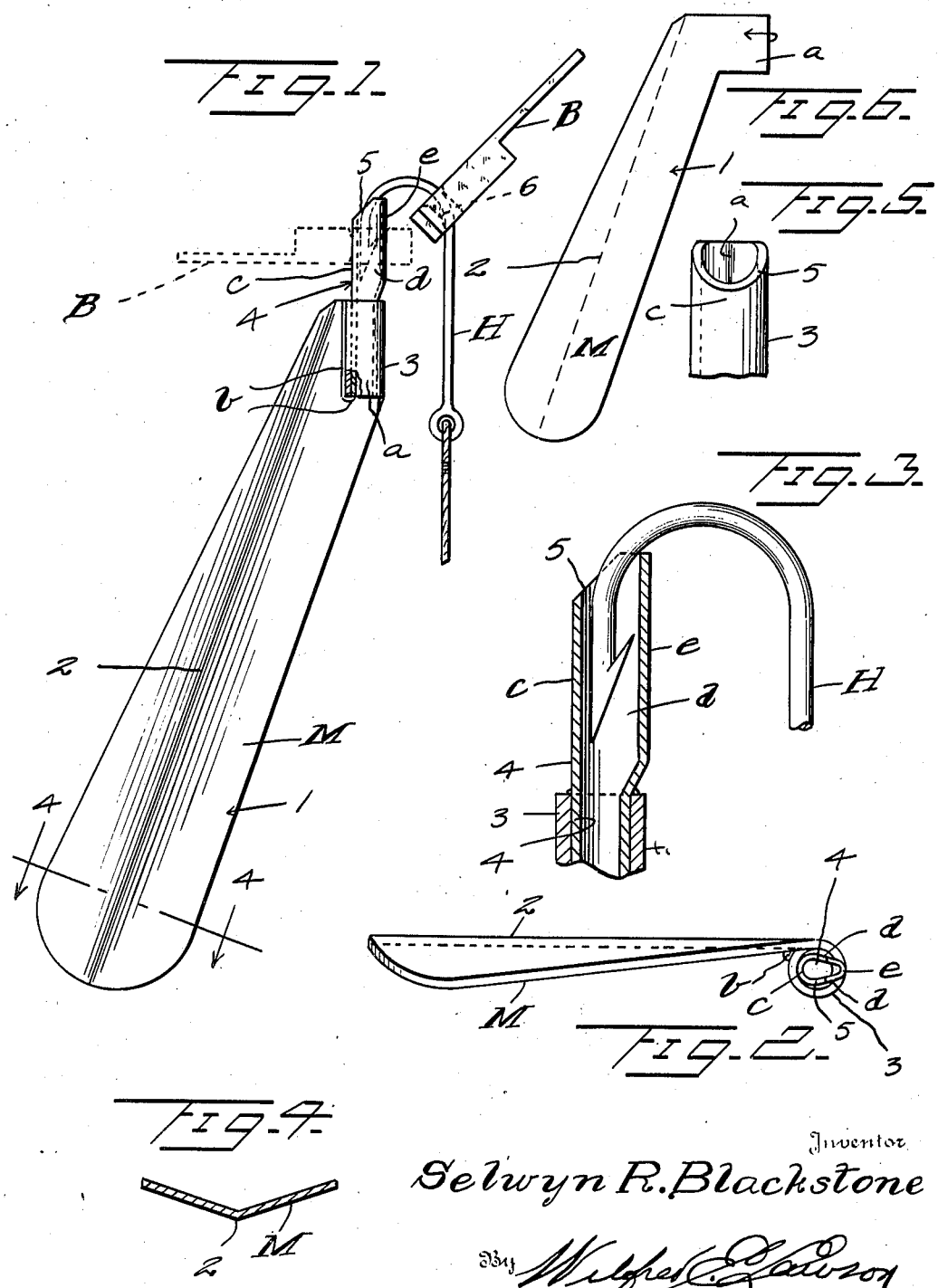

2,333,695

UNITED STATES PATENT OFFICE 2,333,695

HOOK REMOVER

Selwyn R. Blackstone, Madison, Wis.

Application June 7, 1943, Serial No. 489,981

4 Claims. (Cl. 43—29)

This invention relates to a hook remover, and it is primarily an object of the invention to provide a device of this kind which can be employed to advantage by a fisherman for removing a hook from bait and particularly bait known as "pork chunks."

The invention also has for an object to provide a device of this kind including a handle provided with a sheath to receive the barb extremity of a hook and to thread through the opening in the bait on the hook, whereby the bait can be readily and quickly removed and in a manner without injury to the bait.

The invention consists in the details of construction and in the combination and arrangement of the several parts of my improved hook remover whereby certain important advantages are attained, as will be hereinafter more fully set forth.

In order that my invention may be better understood, I will now proceed to describe the same with reference to the accompanying drawing, wherein:

Figure 1 is an elevational view with a part broken away of a hook remover constructed in accordance with an embodiment of my invention, a second position of the bait being indicated by broken lines.

Figure 2 is a view in outer end elevation of the device as illustrated in Figure 1.

Figure 3 is an enlarged detailed fragmentary view partly in section and partly in elevation illustrating in detail the sheath as herein comprised.

Figure 4 is a sectional view taken substantially on the line 4—4 of Figure 1.

Figure 5 is a fragmentary elevational view of the outer end portion of the sheath, and Figure 6 is a view in plan of a blank from which the handle member is formed.

In the embodiment of the invention as illustrated in the accompanying drawing, M denotes an elongated handle member of desired weight and which is produced from a flat plate 1 of suitable design and desired materal. This plate 1 is bent through its long axis whereby, at substantially all points therealong, the handle member M in cross section is in the form of a flattened V, the apex 2 of which constitutes a rib to assure the member M having desired strength and rigidity.

As illustrated, the handle member M tapers from substantially one end toward the other and the smaller extremity is provided with a sleeve 3 overlying the plate 1. This sleeve 3, as herein disclosed, is disposed on an angle of approximately 30 degrees with respect to the rib 2 and is entirely to one side of such rib. This sleeve 3 is also disposed outwardly and inwardly with respect to the handle member M.

The sleeve 3, as herein comprised, is produced by rolling back a wing portion $a$ of the blank from which the handle member is produced and soldering or otherwise rigidly securing the returned longitudinal marginal portion of the wing to the plate 1, as indicated at $b$. This solder connection $b$ also, in the present embodiment of the invention, serves to rigidly hold within the sleeve 3 the end portion of an elongated sheath 4 fitted within the sleeve 3.

This sheath 4 is of a length to extend a material distance beyond the outer end of the sleeve 3 and the outer portion thereof is flattened in a manner whereby the back portion $c$ of the sheath 4 at its outer or free extremity is substantially semicircular in cross section and continued by the converging flat side walls $d$.

The outer end of the sheath 4 has its back portion at the free extremity thereof cut off or beveled, as at 5, from substantially the transverse center of the sheath and the outer end of the sheath 4 at the opposite side of said substantially transverse center is at right angles thereto. This particular form of the outer extremity of the sheath 4 gives the portion of the hook H received within the sheath 4 more backing with a minimum of rocking movement.

It is also to be noted that the outer margins of the converging side walls $b$ are connected by a substantially semicircular intermediate portion $e$. This portion $e$ is midway of the back portion $c$ or, in other words, the back portion $c$ and the smaller or front portion $e$ are disposed on axes in a plane at right angles to the plane of the outer margins of the back portion $c$.

It is also to be noted that the bevel 5 is disposed in a direction with its low point in substantially the same plane as the plane of the axis of the back portion $c$ and the intermediate portion $e$.

The device is particularly adapted for use in the removal of a bait B of the "pork chunk" type. As is well known, pork chunks and pork rinds are very tough material and often the hole 6 as initially put in by the makers is not large enough to add the additional stretching needed to allow the bait B when being removed to slide down over the sheath 4. However, by having the wall of this sheath 4 thin and the outer or free end pointed in the manner hereinbefore described, any such disadvantage will be avoided.

It is also to be noted that the outer or free end of the sheath 4 is of such form as to so fit outside of the barb to assure the bait passing from the hook to the sheath with a minimum of resistance.

My device as herein comprised is also advantageous for use in connection with the spoon type of hook although, of course, I do not wish to be understood as limiting myself in this respect.

From the foregoing description it is thought to be obvious that a hook remover constructed in accordance with my invention is particularly well adapted for use by reason of the convenience and facility with which it may be assembled and operated.

What is claimed is:

1. A device for removing bait from a fish hook comprising a handle member, and a sheath extending outwardly therefrom, the outer extremity of the sheath having a portion inwardly beveled and the outer portion of the sheath having converging flat-like side walls extending part way thereacross.

2. A device for removing bait from a fish hook comprising a handle member, and a sheath extending outwardly therefrom, the outer extremity of the sheath having a portion inwardly beveled and the outer portion of the sheath having converging flat-like side walls extending part way thereacross, the outer end of the sheath to one side of the bevel being substantially at right angles to the longitudinal axis of the sheath.

3. A device for removing bait from a fish hook comprising an elongated handle member, a sleeve carried by an end portion thereof, and a sheath having an end portion rigidly fitted within the sleeve, the outer end portion of the sheath being beveled, said sheath having a side portion thereof flattened.

4. A device for removing bait from a fish hook comprising an elongated handle member, a sleeve carried by an end portion thereof, and a sheath having an end portion rigidly fitted within the sleeve, the outer end portion of the sheath being beveled, said sheath having a side portion thereof flattened, said beveled portion extending part way across the sheath.

SELWYN R. BLACKSTONE.